United States Patent [19]
Faix et al.

[11] 3,949,715
[45] Apr. 13, 1976

[54] MANIFOLD CONSTRUCTION FOR AN INTERNAL COMBUSTION ENGINE

[75] Inventors: Louis J. Faix, Washington; Robert T. Price, Rochester; James R. Spaulding, Royal Oak, all of Mich.

[73] Assignee: General Motors Corporation, Detroit, Mich.

[22] Filed: Aug. 20, 1974

[21] Appl. No.: 499,028

[52] U.S. Cl. 123/52 MC; 123/122 AB; 123/193 CH; 123/193 H; 60/278; 60/305
[51] Int. Cl.² .................................. F02M 35/00
[58] Field of Search ........ 123/52 M, 52 MC, 122 R, 123/122 AB, 119 A, 193 CH, 193 H, 122 AC; 60/278, 304, 305

[56] References Cited
UNITED STATES PATENTS

| | | | |
|---|---|---|---|
| 2,251,604 | 8/1941 | Sladky | 123/52 M |
| 2,289,083 | 7/1942 | Stortz | 123/52 M |
| 2,660,988 | 12/1953 | Reindl | 123/52 MC |
| 3,060,914 | 10/1962 | Morano | 123/52 MC |
| 3,109,416 | 11/1963 | Rose et al. | 123/122 AB X |
| 3,641,989 | 2/1972 | Hill | 123/119 A |
| 3,724,218 | 4/1973 | Cole | 60/305 X |
| 3,832,984 | 9/1974 | Taguchi | 123/122 AC X |
| 3,842,810 | 10/1974 | Yagi et al. | 123/52 M X |

*Primary Examiner*—Charles J. Myhre
*Assistant Examiner*—William C. Anderson
*Attorney, Agent, or Firm*—Robert J. Outland

[57] ABSTRACT

An internal combustion engine having a cylinder head with integral intake manifold and a planar mounting face which is secured to the cylinder block and on which the exhaust manifold is also mounted. The head member incorporates an open bottomed mixture plenum closed by a heated wall of the exhaust manifold for supplying mixture heat. The plenum receives mixture through an inlet tube perforated to distribute recirculated exhaust gases from an annular chamber in the head. Mixture passes from the plenum through a pair of upwardly angled feeder passages to separate longitudinally aligned distribution passages feeding the intake ports of front and rear groups of cylinders. The head also incorporates an open topped secondary air gallery connected through distribution tubes with the exhaust ports and closed by an extended flange on the engine rocker cover through which air is supplied. The arrangement provides advantages in manufacturing and mixture distribution for improved operation.

4 Claims, 6 Drawing Figures

MANIFOLD CONSTRUCTION FOR AN INTERNAL COMBUSTION ENGINE

FIELD OF THE INVENTION

This invention relates to internal combustion engines and more particularly to a six-cylinder in-line spark ignition gasoline fueled engine arrangement having improved manifolding and design features.

BACKGROUND OF THE INVENTION

It is known in the construction of multi-cylinder in-line internal combustion engines to provide a cylinder head having various components attached thereto, such as manifolds for intake and exhaust gases, secondary combustion air and the like. Separate machined surfaces are often provided for mounting the various components in addition to a mounting face which is secured to the cylinder block and a machined surface provided for the usual rocker or valve cover. In addition, provision may be made for supplying recirculated exhaust gases to one or more of the intake passages. Interconnection of the exhaust and intake manifolds to provide mixture heat may utilize additional machined surfaces. In such engines, design of the manifold passages to obtain substantially equal distribution of the air-fuel mixture to, and volume charging of, the various cylinders is of considerable importance.

SUMMARY OF THE INVENTION

The present invention provides an engine arrangement having a cylinder head with integral intake manifold which provides novel internal passage arrangements giving improved mixture formation and distribution. The invention further provides a reduction in the number of machined surfaces by utilizing a single mounting face of the cylinder head for connection with both the cylinder block and the exhaust manifold and another mounting surface for the rocker cover which both encloses the valve gear and covers a separate secondary air gallery. Even distribution of recirculated exhaust gases is aided by their passage through a perforated sleeve to the mixture plenum inlet passage from a surrounding annular exhaust chamber.

Mixture preparation is improved by heating through contact with a hot wall of the exhaust manifold that closes the open bottomed mixture plenum, and distribution is aided by dividing flow from the plenum into two separate paths leaving the plenum through upwardly angled feeder passages connecting with longitudinally aligned distribution passages that connect separately with the front and rear cylinders of the engine.

These and other features of the invention will be more fully understood from the following description of a preferred embodiment taken together with the accompanying drawings.

DESCRIPTION OF THE ILLUSTRATED EMBODIMENT

Figure 1:
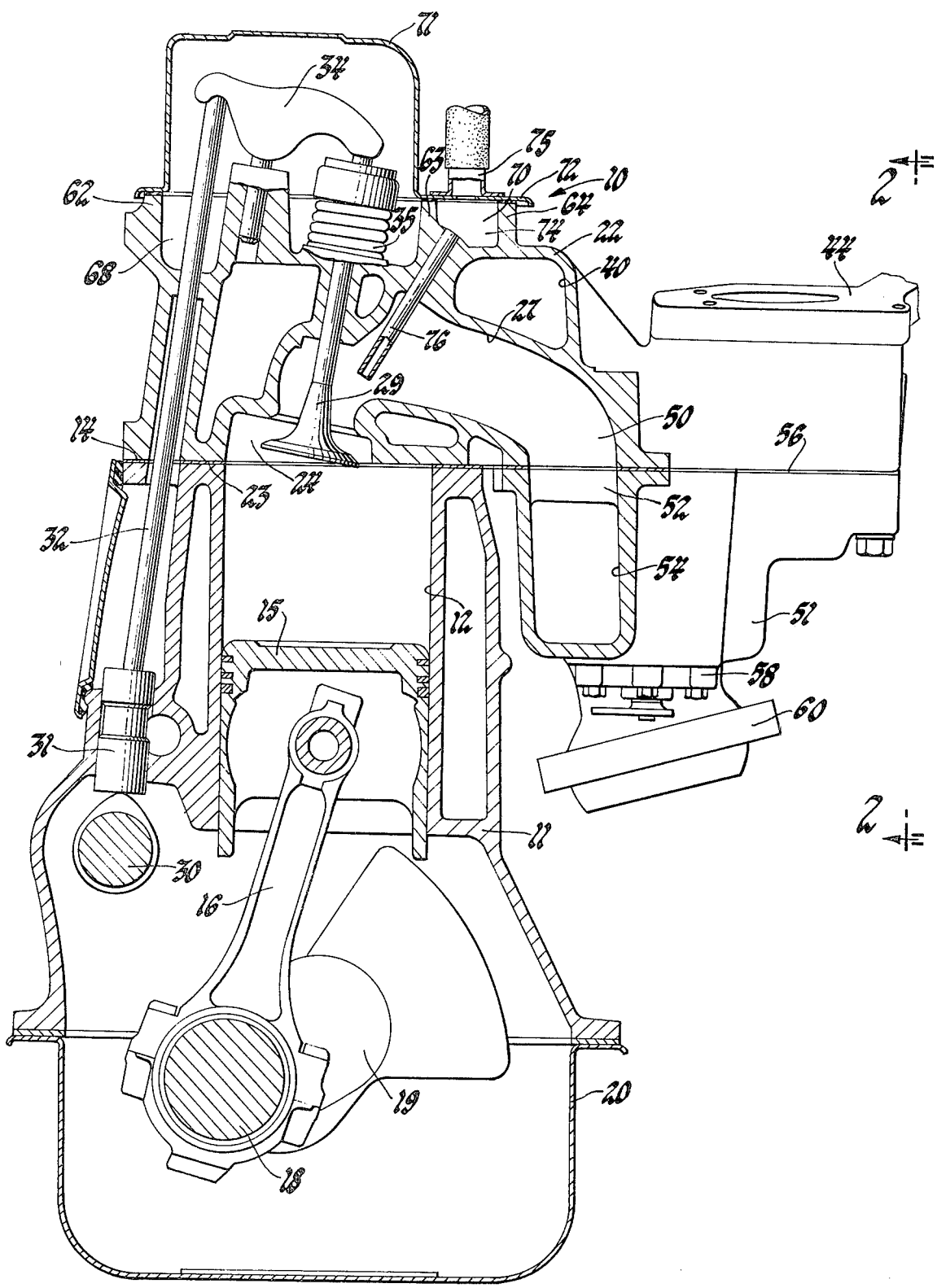
FIG. 1 is a transverse cross-section view of a six-cylinder in-line internal combustion engine formed according to the invention, the section being taken through a manifold exhaust port as indicated by the line 1—1 of FIG. 3.
Figure 2:
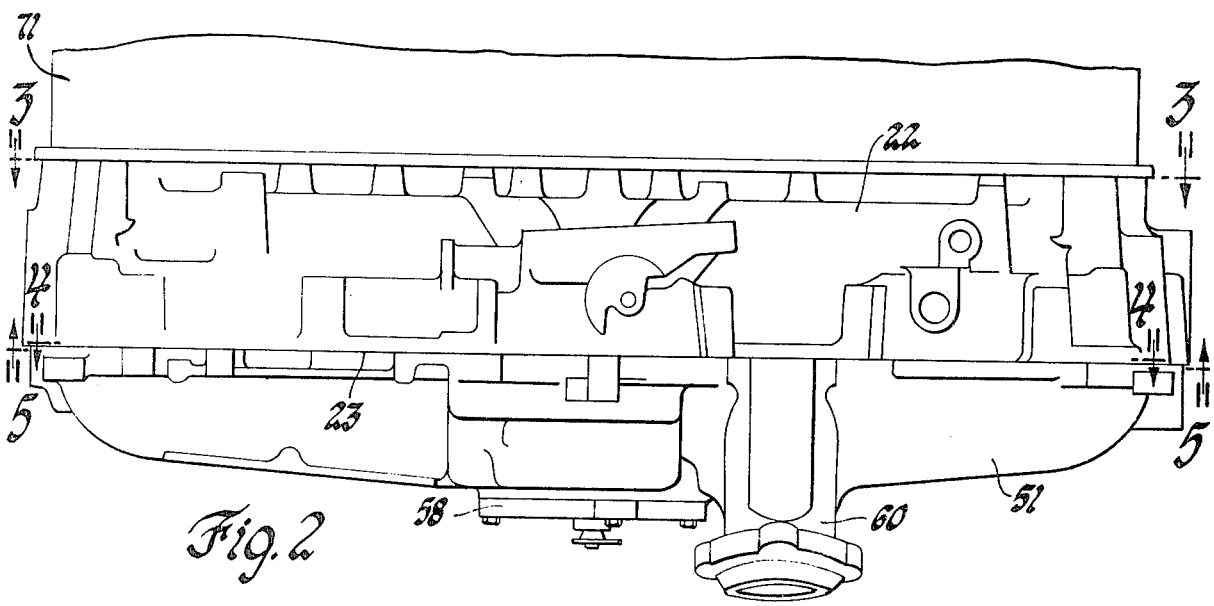
FIG. 2 is a side elevational view showing the cylinder head and exhaust manifold portions of the engine as viewed from the plane indicated by the line 2—2 of FIG. 1.

In the drawings, numeral 10 generally indicates a six-cylinder in-line spark ignition internal combustion engine having a conventionally arranged cylinder block 11. The cylinder block includes six integrally cast cylinders 12 arranged in-line and having their outer ends opening through an upper end wall 14. The cylinders contain the usual pistons 15 connected by connecting rods 16 with individual crank throws 18 of a crankshaft 19 carried for rotation in the cylinder block in conventional manner. The open bottom of the cylinder block containing the crankshaft is closed by an oil pan 20.

A cylinder head and manifold member 22 is formed as an integral casting and is provided with a planar mounting face 23. Mounting face 23 comprises the lower surface of the head 22 by which it is sealingly secured to the upper end wall of the cylinder block 11, closing the upper ends of the cylinders 12. The portions of the cylinder head at the ends of the various cylinders are provided with recesses defining combustion chambers 24. Each combustion chamber 24 is provided with a spark plug 25 and connects with an intake port 26 and an exhaust port 27 formed within the cylinder head and controlled by poppet valves 28, 29, respectively. The valves are actuated in conventional fashion by a camshaft 30 mounted in the cylinder block and acting through valve lifters 31, push rods 32, and rocker arms 34 with coil springs 35 conventionally arranged to bias the valves in closing direction.

Figure 3:
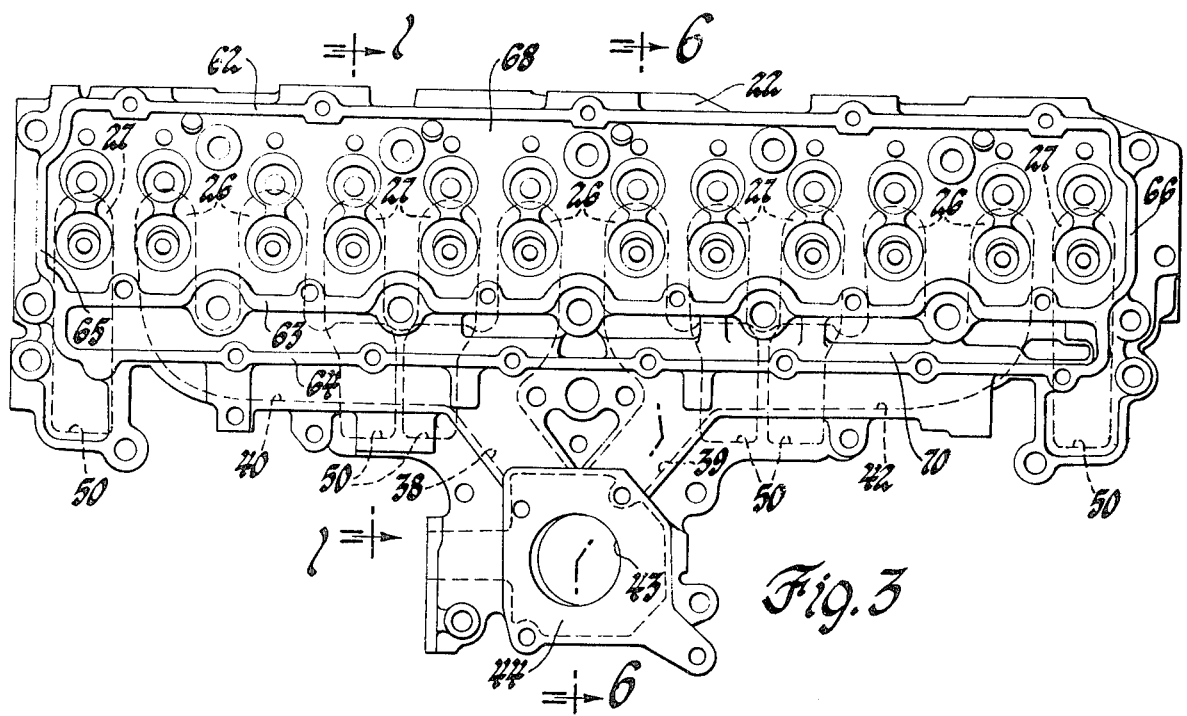
FIG. 3 is a top view showing the integral cylinder head and intake manifold construction as viewed from the plane indicated by the line 3—3 of FIG. 2.
Figure 4:
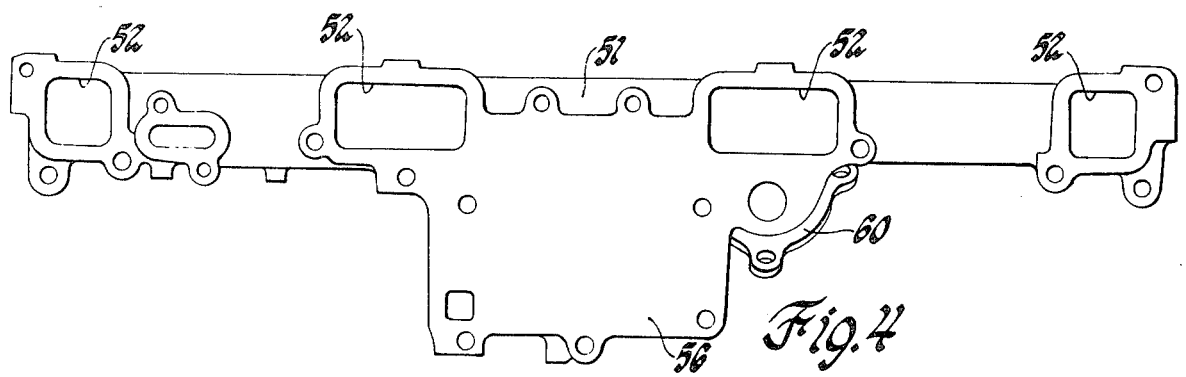
FIG. 4 is a top view of the engine exhaust manifold as viewed from the plane indicated by the line 4—4 of FIG. 2.
Figure 5:
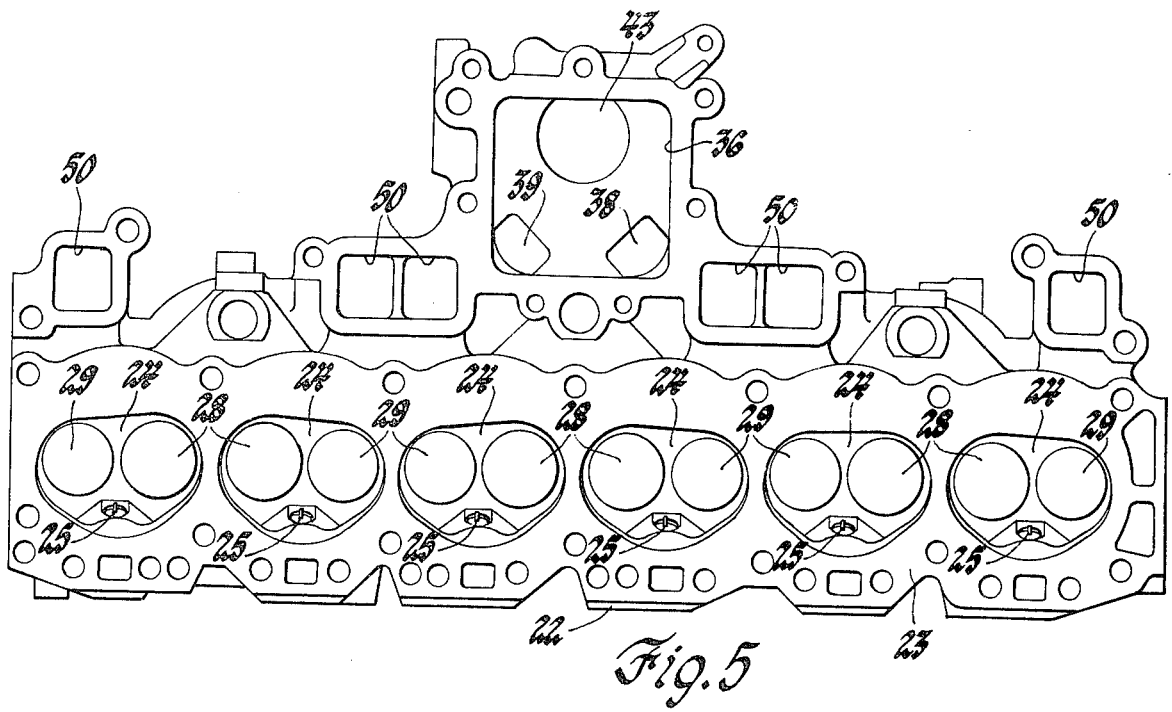
FIG. 5 is a bottom view of the integral cylinder head and intake manifold member as viewed from the plane indicated by the line 5—5 of FIG. 2.
Figure 6:
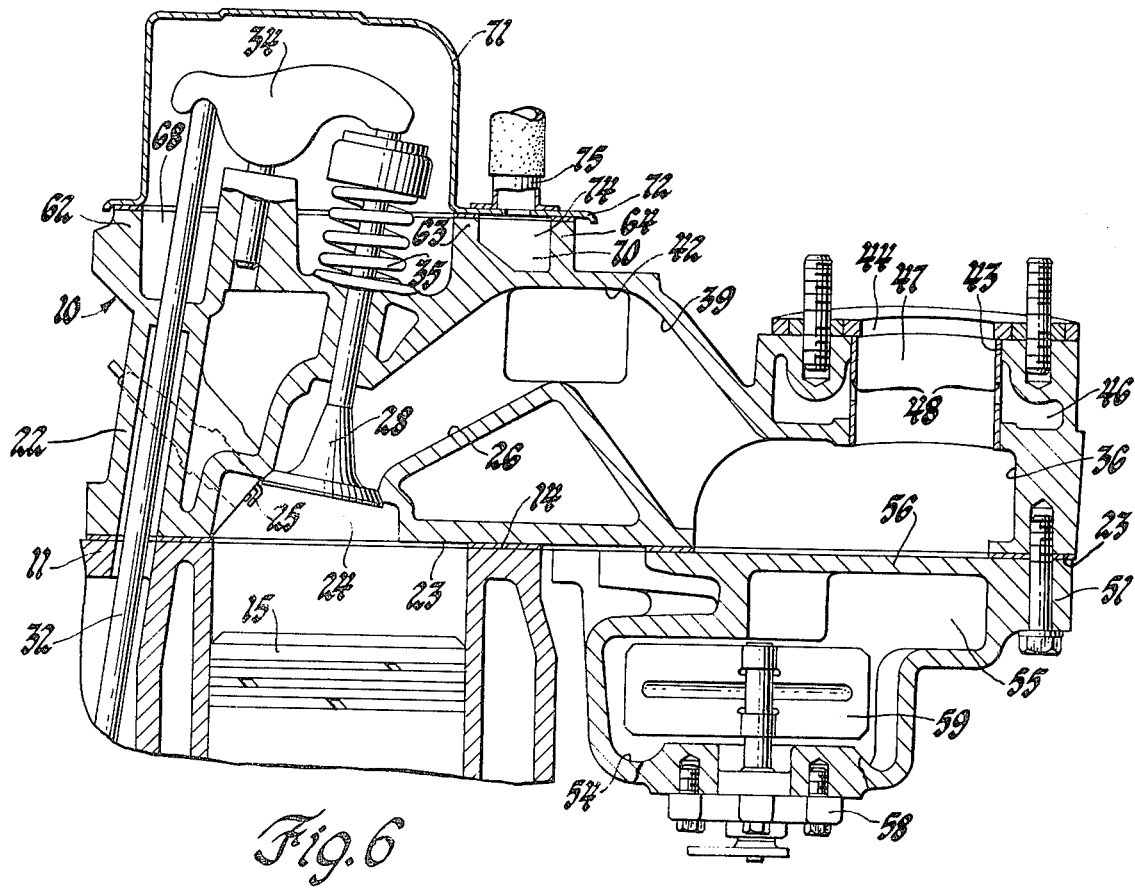
FIG. 6 is a transverse cross-sectional view showing some of the intake manifold passages taken along the planes indicated by the line 6—6 of FIG. 3 as viewed in the direction of the arrows.

The cylinder head member 22 is provided, in a portion laterally distant from the combustion chambers 24 and centered along side them, with an enlarged chamber defining a mixture plenum 36, the bottom of which is open through the planar mounting face 23 of the cylinder head. Plenum 36 connects through a pair of outwardly and upwardly angled feeder passages 38, 39 with separate longitudinally aligned front and rear distribution passages 40, 42, respectively. The distribution passages extend longitudinally within the cylinder head between the row of combustion chambers 24 and the mixture plenum 36 and above the level of both. The front distribution passage 40 connects with the laterally upwardly extending intake ports 26 of the front three engine cylinders, while the rear distribution passage 42 connects with the laterally upwardly angled intake ports of the rear three cylinders. Thus, in plan view, as shown in FIG. 3, the induction passages have somewhat the appearance of moose antlers with the front and rear groups of the three engine cylinders beng separately connected with the mixture plenum 36 through their individual distribution and feeder passages. In cross-section, it is apparent that flow from the mixture plenum is first upward through feeder passages 38, 39 to the longitudinal distribution passages 40, 42 and then downward through the intake ports of the individual cylinders.

To provide for the supply of air-fuel mixture to the mixture plenum 36, the head member 22 includes a mixture opening 43 connecting the upper portion of the plenum with a carburetor mounting boss 44 provided on an upper surface of the head. An annular exhaust chamber 46 is provided in the head surrounding the opening 43 for receiving a portion of the engine exhaust gases through means not shown. A sleeve 47 fitted within the opening 43 defines a mixture intake passage for the plenum 36 and separates it from the annular chamber 46, a plurality of perforations or openings 48 being provided in the sleeve 47 to permit the passage of exhaust gases from the chamber 46 into the intake mixture.

The engine exhaust ports 27 extend laterally from the upper portions of their respective combustion chambers and open downwardly through aligned outlet openings 50 formed in the planar mounting face of the cylinder head adjacent the location of the cylinder block. The exhaust passages of the inner cylinders pass below one of the longitudinally extending intake distribution passages 40, 42.

An exhaust manifold 51 is secured to the planar mounting face 23 of the cylinder head and is provided with a plurality of inlet openings 52 registering with the exhaust port outlet openings 50 and connecting with a longitudinal exhaust passage 54. Passage 54 connects at its center with a heat chamber 55 formed below a machined upper wall 56 of the exhaust manifold. Wall 56 extends below and closes the bottom of the intake mixture plenum 36 of the cylinder head, forming a heated surface for heating the mixture delivered to the plenum.

A heat valve assembly 58 is mounted on the bottom of the exhaust manifold and includes a vane 59 extending with the manifold passages. Vane 59 is movable between two positions, in one of which it directs the flow of exhaust gases from the front engine cylinders through the heat chamber 55 and in the other of which it causes the gases to bypass this chamber. An outlet connection 60 is provided on the manifold for carrying exhaust gases from the manifold to an attached exhaust system (not shown).

Along its upper side the cylinder head is provided with three generally longitudinally extending rails or walls 62, 63, 64 connected at their ends by front and rear walls 65 and 66 and arranged to define first and second recesses 68 and 70, respectively. The tops of the walls 62-66 lie in a single plane and are adapted to sealingly receive a sheet metal valve cover 71 which encloses the engine valve gear located within recess 68. Recess 70 is closed by a laterally extending flange portion 72 of the valve cover to define a longitudinal air gallery 74. A fitting 75 secured to the flange portion 72 provides a connection through which air may be supplied to the gallery 74 from an engine driven air pump (not shown). A plurality of distribution tubes 76 extend from the air gallery, one to each of the exhaust ports 27, to distribute secondary combustion air to the various exhaust ports.

In operation, air-fuel mixture is delivered from a carburetor (not shown) through the intake sleeve 47 where it is mixed with recirculated exhaust gases from the annular chamber 46 with the resulting mixture passing into the mixture plenum 36. Here the mixture is heated by contact with the heated wall 56 of the exhaust manifold which is maintained at a desired temperature by operation of the heat valve 58. The heated mixture moves upwardly through the feeder passages 38, 39 and along the longitudinal distribution passages 40, 42 to the individual cylinder intake ports 26 from which it is delivered to the engine combustion chambers upon opening of the respective intake valves. The upward slope of the feeder passages 38 causes droplets of mixture which may condense on the manifold walls during warm up to be returned to the plenum for vaporization, thus minimizing the effect of fuel condensation on the equal distribution of mixture to the various cylinders. After combustion, the exhaust gases pass through the exhaust ports 27 to the exhaust manifold where some of the gases may be routed by the heat valve through the heat chamber 55 for heating the inlet mixture, after which the exhaust gases are carried out through the discharge outlet connection 60.

The unitary construction and arrangement of the cylinder head with its integral intake manifold minimizes the number of gasketed joints in the system, reducing the possibility for leakage, and also minimizes the number of machined surfaces in the construction. Thus, a single machined surface of the cylinder head mounts against both the exhaust manifold and the cylinder block, while another planar surface along the tops of the upper cylinder head rails mounts the rocker cover and defines both the valve gear housing and the secondary air gallery. A substantial reduction in parts requirements is also obtained by the elimination of attaching means for the intake manifold such as bolts, studs, nuts and washers and of the pipe and connectors conventionally used to form an engine secondary air gallery.

While the invention has been described by reference to a specific embodiment, it should be understood that numerous changes may be made from the details of the disclosed embodiment without departing from the spirit and scope of the inventive concepts involved. Accordingly, the invention is not intended to be limited, except by the language of the following claims.

What is claimed is:

1. The combination in an internal combustion engine of a cylinder block having a plurality of longitudinally aligned cylinders opening through an end wall of said block, a unitary cylinder head and manifold member having a planar mounting face sealingly engaging said block end wall and extending laterally outboard thereof, said head member closing the ends of said cylinders and defining combustion chambers therewith, a plurality of reentrant exhaust ports extending laterally in said cylinder head, said exhaust ports each having one of opposite ends thereof opening to one of said combustion chambers and their other ends opening through said head mounting face adjacent said cylinder block, said other ends forming longitudinally aligned openings in said head mounting face, a mixture receiving plenum in said cylinder head and opening through said mounting face, a pair of mixture flow feeder passages in said head extending upwardly and outwardly from said plenum, a pair of aligned spaced longitudinal distribution passages in said head and extending above and laterally between said cylinders and said plenum, said distribution passages each connecting with one of said feeder passages, a plurality of intake passages in said head, each intake passage connecting with one of said combustion chambers and angled upwardly to connect with an adjacent one of said distribution passages, an exhaust manifold sealingly secured to the said cylinder head mounting face adjacent said cylinder block, said manifold having exhaust passages connecting with said cylinder head exaust ports and a heat chamber beneath said cylinder head plenum, said plenum and said heat chamber being separated by a hot wall, and valve means in said exhaust manifold operable to direct exhaust gases from certain of said exhaust passages through said heat chamber to heat said hot wall.

2. An internal combustion engine having a cylinder block with in-line piston-containing cylinders opening through an end wall of the block, said cylinders comprising front and rear groups, a unitary cylinder head and manifold member having a planar mounting face sealingly engaging said block end wall and extending laterally outboard thereof, said head member closing the ends of said cylinders and defining recessed combustion chambers at said cylinder ends and opening through said mounting face, a mixture receiving plenum in said head member disposed centrally of and laterally adjacent said combustion chambers, said plenum being open on the bottom through said head mounting face and connecting upwardly with an air-fuel mixture inlet passage, a pair of longitudinally aligned distribution passages in said head disposed above and laterally intermediate said plenum and said combustion chambers, one of said distribution passages extending laterally adjacent each of the front and rear groups of cylinders respectively, a pair of feeder passages in said head and connecting with said plenum at closely adjacent locations, said feeder passages extending outwardly from said plenum and upwardly to connect one with each of said distribution passages, near the inner ends thereof, a plurality of intake ports connecting one with each of said combustion chambers, said ports extending laterally upwardly to connect with the adjacent one of said distribution passages, a plurality of exhaust ports connecting one with each of said combustion chambers and extending laterally to aligned openings in said head mounting surface, certain of said exhaust ports extending beneath said distribution passages, and an exhaust manifold secured to the said head member mounting face adjacent said cylinder block and having a wall portion extending beneath and closing the open bottom of said plenum, said exhaust manifold having passages connecting with said exhaust ports and a heat chamber beneath said wall portion, and valve means in said exhaust manifold operable to direct exhaust gases from certain of said exhaust passages through or around said heat chamber to provide exhaust heat to said manifold wall portion to vaporize fuel in said plenum during engine warm-up.

3. An internal combustion engine having a cylinder block with in-line piston-containing cylinders opening through an end wall of the block, said cylinders comprising front and rear groups, a unitary cylinder head and manifold member having a planar mounting face sealingly engaging said block end wall, said head member closing the ends of said cylinders and defining recessed combustion chambers at said cylinder ends and opening through said mounting face, a mixture receiving plenum in said head member disposed centrally of and laterally adjacent said combustion chambers, said plenum connecting upwardly with an air fuel mixture inlet passage, a pair of longitudinally aligned distribution passages in said head disposed above and laterally intermediate said plenum and said combustion chambers, one of said distribution passages extending laterally adjacent each of the front and rear groups of cylinders respectively, a pair of feeder passages in said head and connecting with said plenum at closely adjacent locations, said feeder passages extending outwardly from said plenum and upwardly to connect one with each of said distribution passages, near the inner ends thereof, a plurality of intake ports connecting one with each of said combustion chambers, said ports extending laterally upwardly to connect with the adjacent one of said distribution passages, a plurality of exhaust ports connecting one with each of said combustion chambers and extending laterally to aligned openings in said head mounting surface, certain of said exhaust ports extending beneath said distribution passages, a plurality of poppet valves reciprocably mounted in said head member and operable to close and open said intake and exhaust ports, wall means defining a first longitudinal recess along the top of said head member within which are mounted valve actuating means, said wall means defining a second longitudinal recess adjacent the first recess and extending longitudinally beside it over said exhaust ports, a rocker cover mounted on said wall means and enclosing said first recess and the valve actuating means therein, said rocker cover having a laterally extending flange portion extending over and closing said second recess to define a secondary air gallery therewith, means connecting said air gallery with each of said exhaust ports to supply secondary air thereto, and means for admitting air to said air gallery.

4. An internal combustion engine comprising an integral cylinder head and manifold member having a planar mounting surface with a cylinder block and an exhaust manifold secured to adjacent portions of said mounting surface, said head member having a plurality of longitudinally aligned combustion chamber recesses opening through said mounting surface, intake and exhaust ports connecting with each of said recesses, said exhaust ports opening through said mounting surface adjacent said recesses, a mixture plenum laterally spaced from said recesses and extending adjacent said mounting surface, and intake passages connecting said intake ports with said mixture plenum internally of said head member, said cylinder block having a plurality of piston containing cylinders connecting one with each of said combustion chambers, and
a heat transmitting wall closing and forming the bottom wall of said mixture plenum,
said exhaust manifold having exhaust passages connecting with said head member exhaust ports and extending adjacent said plenum bottom wall for transferring exhaust heat therethrough to the mixture supplied to the intake passages.

* * * * *